United States Patent [19]

Morimoto

[11] Patent Number: 4,909,103
[45] Date of Patent: * Mar. 20, 1990

[54] SYSTEM FOR CONTROLLING A CONTINUOUSLY VARIABLE TRANSMISSION HAVING A TORQUE CONVERTER

[75] Inventor: Yoshihiko Morimoto, Mitaka, Japan

[73] Assignee: Fuji Jukogyo Kabushiki Kaisha, Tokyo, Japan

[*] Notice: The portion of the term of this patent subsequent to Jul. 4, 2006 has been disclaimed.

[21] Appl. No.: 200,751

[22] Filed: May 31, 1988

[30] Foreign Application Priority Data

Jun. 2, 1987 [JP] Japan .................. 62-139463

[51] Int. Cl.$^4$ .......................................... B60K 41/12
[52] U.S. Cl. ........................................ 74/866; 74/867
[58] Field of Search ........... 74/866, 867, 868, 733, 74/731; 192/3.31, 3.3; 364/424.1

[56] References Cited

U.S. PATENT DOCUMENTS

| | | | |
|---|---|---|---|
| 4,478,322 | 10/1984 | Carlson et al. | 192/3.31 X |
| 4,495,576 | 1/1985 | Ito | 74/867 X |
| 4,510,822 | 4/1985 | Yamamura et al. | 192/331 X |
| 4,597,308 | 7/1986 | Tanaka et al. | 74/866 |
| 4,601,368 | 7/1986 | van Deursen | 192/3.31 X |
| 4,660,440 | 4/1987 | Matsumura et al. | 74/866 |
| 4,669,336 | 6/1987 | Okada et al. | 74/867 |
| 4,682,518 | 7/1987 | Takada et al. | 74/867 |
| 4,715,145 | 12/1987 | Takeda et al. | 74/866 X |
| 4,730,709 | 3/1988 | Kawata et al. | 192/3.31 |
| 4,735,113 | 4/1988 | Yamamuro et al. | 74/866 |

FOREIGN PATENT DOCUMENTS 55-109854  8/1980  Japan .
57-161359  10/1982  Japan .

Primary Examiner—Leslie A. Braun
Assistant Examiner—William Gehris
Attorney, Agent, or Firm—Martin A. Farber

[57] ABSTRACT

A continuously variable belt drive transmission has a torque converter with a lockup clutch. Transmission ratio of the transmission starts to change in accordance with driving conditions of a vehicle, and the lockup clutch is engaged in accordance with driving conditions of the vehicle. A start signal for starting of the changing of the transmission ratio is produced in accordance with driving conditions, and a lockup signal for engaging of the lockup clutch is produced in accordance with driving conditions. In response to the start signal and to the lockup signal the change of the transmission ratio and engaging of the lockup clutch are performed at the same time.

6 Claims, 7 Drawing Sheets

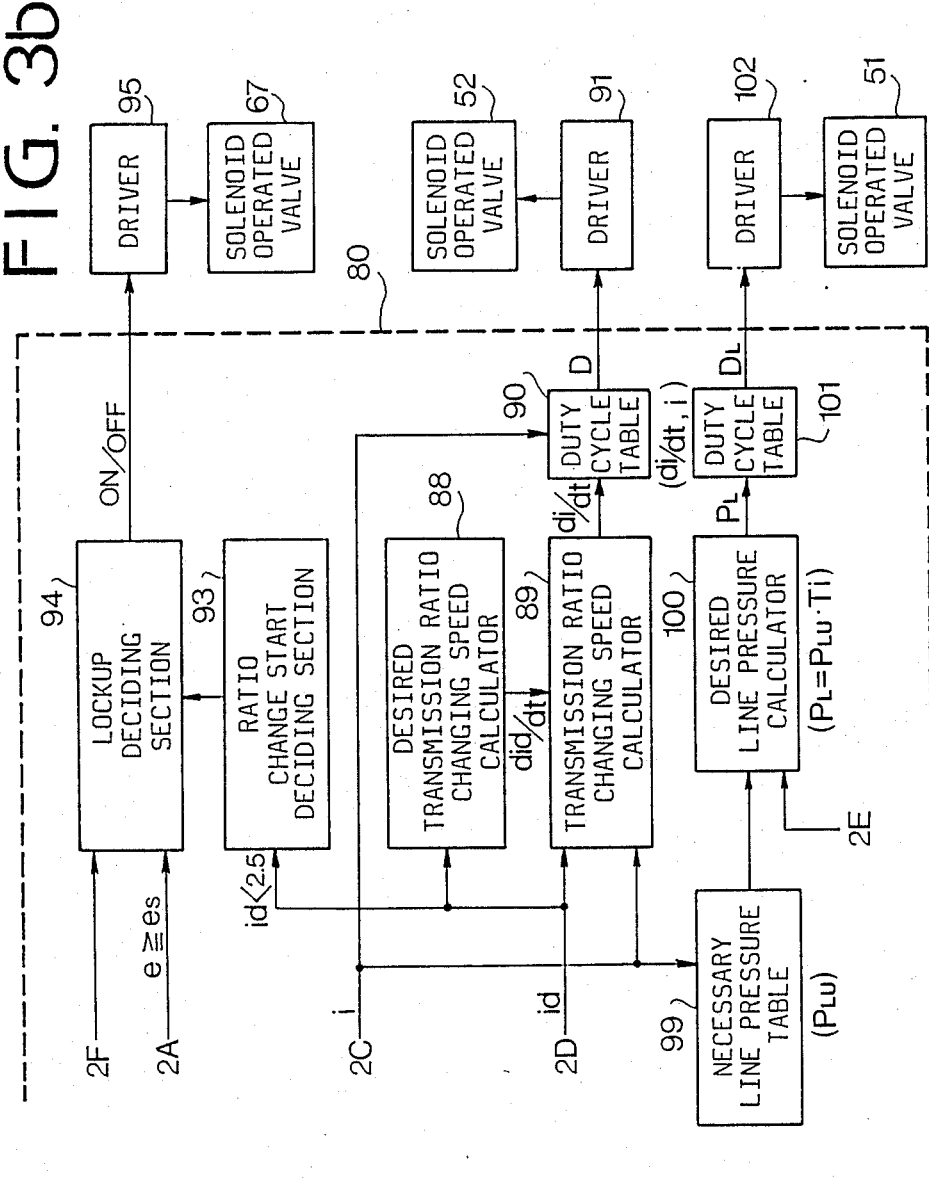

SYSTEM FOR CONTROLLING A CONTINUOUSLY VARIABLE TRANSMISSION HAVING A TORQUE CONVERTER

BACKGROUND OF THE INVENTION

The present invention relates to a hydraulic control system for a continuously variable belt-drive automatic transmission for a motor vehicle, and more particularly to a system for controlling a continuously variable transmission having a torque converter with a lockup clutch.

A continuously variable transmission having a torque converter with a lockup clutch is known. The torque converter operates to multiply the torque of an engine, so that the vehicle can be smoothly started. After the start of the vehicle, the torque converter is preferably locked up thereby preventing a loss of power and improving the fuel consumption. Thus, various control systems for controlling the lockup clutch have been proposed in order to effectively use such characteristics.

Japanese Patent Laid Open No. 55-109854 discloses a control system for a lockup clutch wherein the lockup clutch is engaged depending on the speed ratio of the speed of an input member to the speed of an output member of the torque converter to overcome the inefficiency of the torque converter.

However, if such a control system, in which the lockup clutch is operated regardless of the control of the transmission ratio, is applied to the continuously variable transmission, various problems arise.

For example, a relationship between the engine torque characteristic and the rotational speed ratio characteristic of the torque converter is shown in FIG. 6a. The torque converter characteristic is shown in FIG. 6b. The rotational speed ratio e is the ratio of speed of an input member of the torque converter to speed of an output member thereof, which is obtained from the ratio of engine speed Ne to drive pulley speed Np (e=Ne/Np). The converter operational zone and the coupling zone is divided at a point where the rotational speed ratio e is 0.85. The converter operational zone is in the range of $0 \leq e < 0.85$. The coupling zone is in the range of $0.85 \leq e$.

As shown in FIG. 6a, if the transmission ratio is fixed at a point A while the vehicle is driven, the drive pulley speed Np increases with increase of the vehicle speed. Accordingly, the torque converter condition enters into the coupling zone as shown by an arrow A'. The torque converter is preferable to be locked up in the coupling zone. On the other hand, if the transmission ratio is upshifted under this driving condition, the drive pulley speed Np decreases. Thus, the torque converter enters into the operational zone as shown by an arrow A''. As a result, the lockup of the torque converter is not effected.

Accordingly, it is preferable for the lockup control to cooperate with the transmission control. It is important to fix the transmission ratio so that the torque converter enters into the coupling zone, in order to lock up the torque converter.

When the transmission starts to change at starting of the vehicle, acceleration of the vehicle is multiplied by the upshifting of the transmission, causing a shock by +G as shown in FIG. 7. On the other hand, when the torque converter is locked up, the vehicle speed reduces, causing a shock by −G. It is desired to prevent these shocks.

SUMMARY OF THE INVENTION

The object of the present invention is to provide a control system which appropriately controls a torque converter and a lockup clutch at starting of the vehicle.

The other objects and features of this invention will become undertstood from the following description with reference to the accompanying drawings.

BRIEF DESCRIPTION OF DRAWINGS

FIGS. 3a and 3b show a block diagram of a control unit of the present invention;

DETAILED DESCRIPTION OF THE PREFERRED EMBODIMENT

Figure 1:
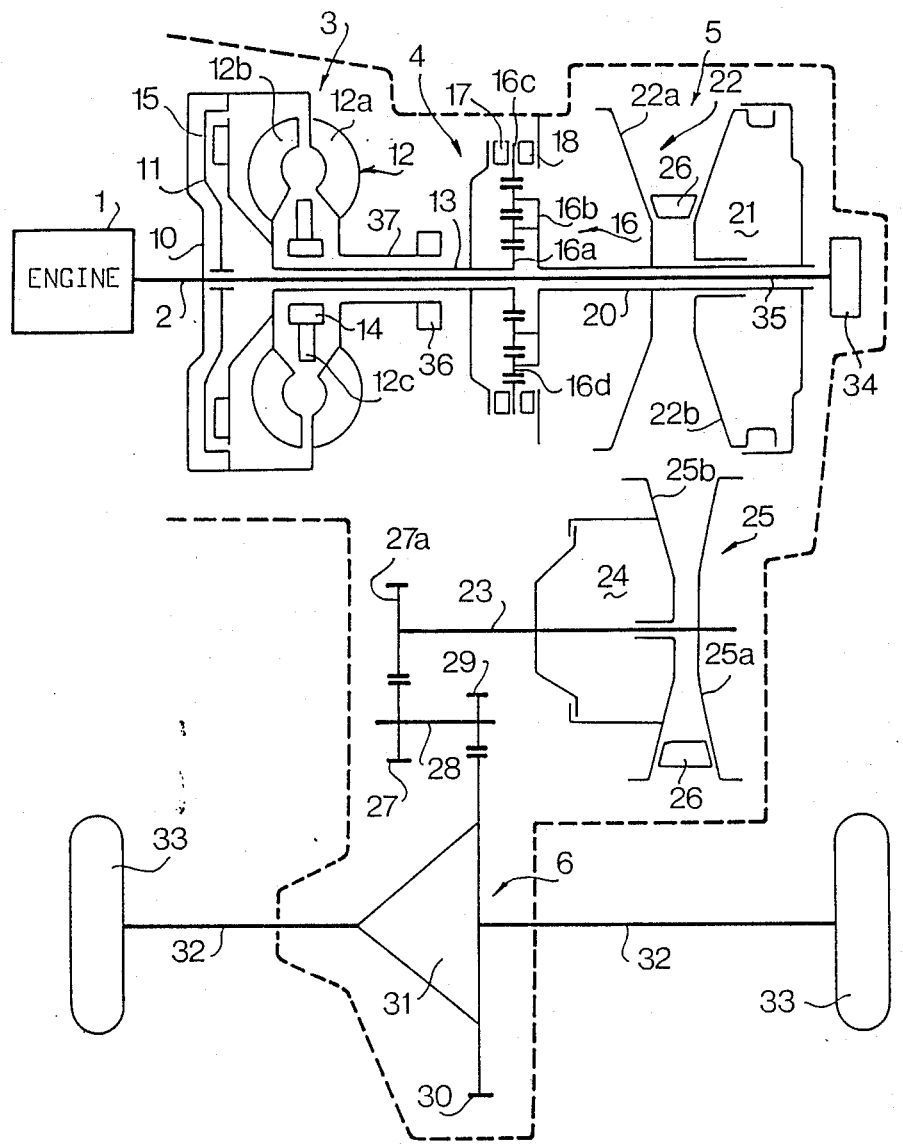
FIG. 1 shows a schematic diagram of a continuously variable belt-drive transmission to which the present invention is applied.

FIG. 1 shows a four-wheel drive power transmission system with a continuously variable belt-drive automatic transmission for a motor vehicle, to which the present invention is applied. An engine 1 is mounted on a motor vehicle at a front portion thereof. The power transmission system comprises a torque converter device 3, a selector device 4, a continuously variable belt-drive transmission 5, and a final reduction and differential device 6.

The torque converter device 3 has a torque converter 12 with a lockup clutch 15. A drive plate 10 is fixed to a crankshaft 2 of the engine 1. A converter cover 11 is secured to the drive plate 10. The torque converter 12 comprises an impeller 12a integral with the converter cover 11 by welding, a turbine 12b connected to an input shaft 13, and a stator 12c connected to a one-way clutch 14. The lockup clutch 15 is disposed between the converter cover 11 and the torque converter 12 for making contact with the cover 11.

The selector device 4 comprises a planetary gear 16 having a pair of pinions 16d, and a sun gear 16a mounted on the input shaft 13. Pinions 16d are supported on a carrier 16b. The sun gear 16a is engaged with a ring gear 16c through pinions 16d. A forward clutch 17 is disposed between the sun gear 16a and the ring gear 16c. A reverse brake 18 is disposed between the ring gear 16c and a main case. At forward driving such as a drive range (D) selection, the forward clutch 17 is engaged to lock the sun gear 16a. At reverse driving, the reverse brake 18 is engaged to lock the ring gear 16c for reversely rotating the carrier 16b.

The belt-drive transmission 5 has a main shaft 20 engaged with the carrier 16b and an output shaft 23 provided in parallel with the main shaft 20. A drive pulley (primary pulley) 22 and a driven pulley (secondary pulley) 25 are mounted on the main shaft 20 and output shaft 23, respectively. A fixed conical disc 22a of the drive pulley 22 is integral with main shaft 20 and an axially movable conical disc 22b is axially slidably mounted on the main shaft 20. The movable conical disc 22b also slides in a cylinder 21 formed on the main shaft 20 to provide a servo device.

A fixed conical disc 25a of the driven pulley 25 is formed on the output shaft 23 opposite the movable conical disc 22b and a movable conical disc 25b is slidably mounted on the shaft 23 opposite the disc 22a. Movable conical disc 25b has a cylindrical portion which is slidably engaged in a cylinder 24 of the output shaft 23 to form a servo device. A drive belt 26 engages with the drive pulley 22 and the driven pulley 25. The cylinder 21 of the drive pulley 22 is so designed that the pressure receiving area thereof is larger than that of the cylinder 24 of the driven pulley 25. Thus, the running diameter of the belt 26 on the pulleys is varied dependent on driving conditions.

Secured to the output shaft 23 is a drive gear 27a of the final reduction device 6 which engages with an intermediate reduction gear 27 on an intermediate shaft 28. An intermediate gear 29 on the shaft 28 engages with a final reduction gear 30. The rotation of the final reduction gear 30 is transmitted to axles 32 of vehicle driving wheels 33 through a differential 31.

In the transmission 5, a main oil pump 34 is provided for supplying a high pressure of oil for the transmission. The main shaft 20 has an axial passage in which a main oil pump driving shaft 35 connected to the crankshaft 2 is rotatably mounted. An auxiliary oil pump 36 for the torque converter device 3 is housed therein. An auxiliary pump drive shaft 37 is connected to the impeller 12a and is operatively connected with the converter cover 11.

Figure 2:
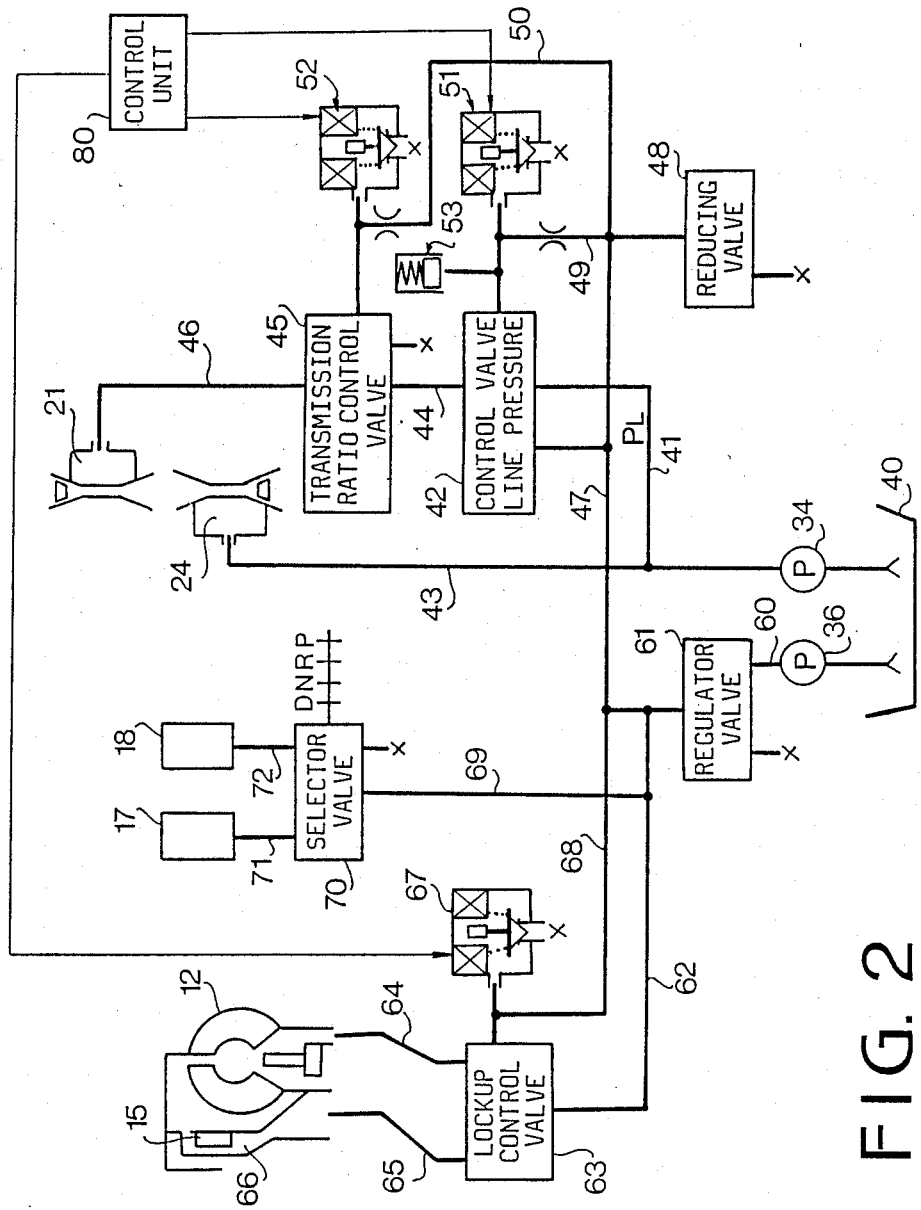
FIG. 2 shows a hydraulic control circuit for the transmission.

Referring to FIG. 2, showing a hydraulic control circuit, oil in an oil reservoir 40 is supplied to a line pressure control valve 42 through a line pressure passage 41 by the pump 34. An oil passage 43 connected to the passage 41 is communicated with the cylinder 24 of the driven pulley 25. The passage 41 is further communicated with a transmission ratio control valve 45 through a passage 44. The cylinder 21 of drive pulley 22 is applied with pressurized oil passing through the passage 41, line pressure control valve 42, passage 44, transmission ratio control valve 45, and a passage 46.

A passage 47 connected to the oil pump 36 is communicated with a reducing valve 48 for providing a constant reducing pressure of oil. A conduit 49 is communicated with the line pressure control valve 42, with a solenoid operated on-off valve 51 and with an accumulator 53. A conduit 50 is communicated with the transmission ratio control valve 45 and with a solenoid operated on-off valve 52.

The solenoid operated valve 51 is adapted to be operated by duty signals from a control unit 80 for producing control pressure in the form of pulses. The pulsation of the control pressure is smoothed by the accumulator 53 and the control pressure is applied to the line pressure control valve 42, so that the line pressure $P_L$ is controlled in accordance with the transmission ratio i, engine torque Te, and torque increasing factor of the torque converter.

The solenoid operated valve 52 is also operated by duty signals and produces reducing pressure which is applied to the transmission ratio control valve 45 for shifting a spool of the valve 45 to an oil supply position and an oil drain position by the degree of the duty cycle. Thus, the flow rate of oil supplied to or drained from the cylinder 21 of the drive pulley 22 is controlled to provide optimum transmission ratio i.

A passage 60 from the oil pump 36 is communicated with a regulator valve 61 for producing a predetermined low pressure of oil. The regulator valve 61 is communicated with the lockup control valve 63 through a passage 62. The lockup control valve 63 is communicated with the torque converter 12 through a passage 64 and a release side oil chamber 66 of the lockup clutch 15 through a passage 65. The lockup control valve 63 is communicated with the reducing valve 48 through passage 68 for supplying with the reducing pressure. The reducing pressure is also supplied to a solenoid operated on-off valve 67. The solenoid operated valve 67 operates the lockup control valve 63 by duty signals from the control unit 80 to communicate the passage 62 with the passage 64 or the passage 65.

When the lockup signal is not generated, the lockup control valve 63 operates to communicate the passage 62 with the passage 65 for supplying the pressure of oil to the torque converter 12 through the release side oil chamber 66. When the lockup signal is generated, the passage 62 is communicated with the passage 64 for pushing the lockup clutch 15 to the converter cover 11, which means locking of the torque converter.

The passage 62 is further communicated with a selector valve 70 through a passage 69. The selector valve 70 is communicated with the forward clutch 17 through a passage 71 and with the reverse brake 18 through a passage 72. The selector valve 70 is provided for selectively connecting passages in accordance with operations of a selector lever for selecting operational ranges such as a parking range (P), reverse range (R), neutral range (N), and drive range (D). In the D range selection, the selector valve 70 operates to communicate the passage 69 with the passage 71 for supplying the pressure of oil to the forward clutch 17. In the R range selection, the passage 69 is communicated with the passage 72 for supplying the pressure of oil to the reverse brake 18. In the P, N ranges selections, oil in the forward clutch 17 and the reverse brake 18 are drained.

Figure 3A:
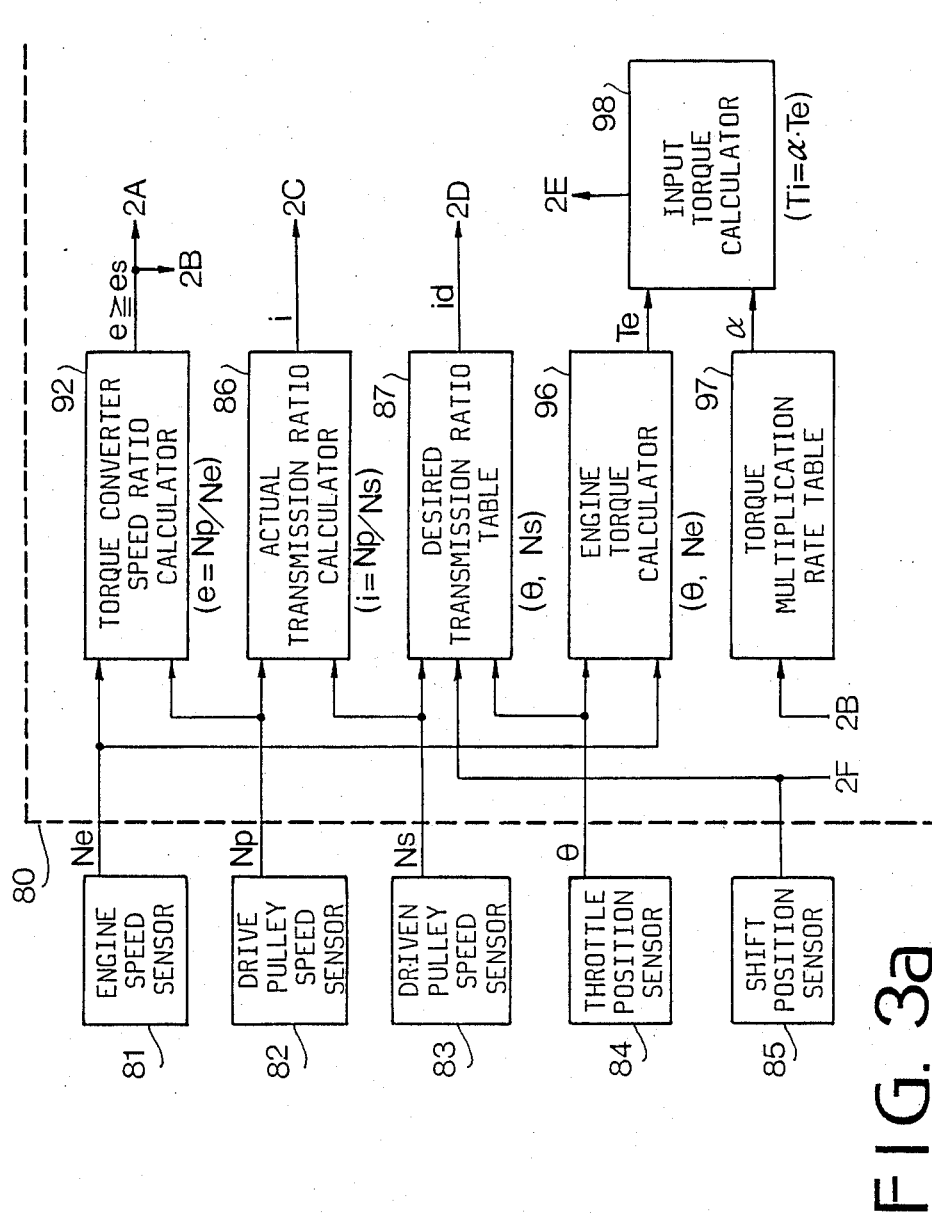

Referring to FIGS. 3a and 3b, the system is arranged to control the transmission ratio, the lockup clutch for the torque converter, and the line pressure. In the system, an engine speed sensor 81, a drive pulley speed sensor 82, a driven pulley speed sensor 83, a throttle position sensor 84, and a shift position sensor 85 are provided.

Output signals $N_P$ and $N_S$ of sensors 82, 83 are fed to an actual transmission ratio calculator 86 to produce an actual transmission ratio i in accordance with $i = N_P/N_S$. Output signal $N_S$, output signal $\theta$ representing the opening degree of the throttle position sensor 84, and output signal of the sensor 85 are fed to a desired transmission ratio table 87. The desired transmission ratio id is derived from the table 87 in accordance with signals $N_S$ and $\theta$.

The desired transmission ratio id is fed to a desired transmission ratio changing speed calculator 88 which produces a desired transmission ratio changing speed (rate) did/dt. The speed (rate) did/dt is the amount of change of the desired transmission ratio id during a predetermined time interval. The actual transmission ratio i, desired transmission ratio id, desired transmission ratio changing speed (rate) did/dt are applied to a transmission ratio changing speed calculator 89 to produce a transmission ratio changing speed (rate) di/dt from the formula as follows.

$$di/dt = K1(id-i) + K2 \cdot did/dt$$

Where K1, K2 are coefficients, $id-i$ is a controlling amount dependent on the difference between the desired and actual transmission ratios, and did/dt is a correction factor for the delay in operation of the system.

The speed (rate) di/dt and actual transmission ratio i are applied to a duty cycle table 90 to derive a duty cycle D in accordance with D=f (di/dt, i) using a table at upshift and downshift of the transmission. The duty cycle D is supplied to the solenoid operated on-off valve 52 through a driver 91.

The engine speed signal Ne from the sensor 81 and the drive pulley speed signal Np from the sensor 82 are applied to a torque converter condition deciding section 92 to produce an actual torque converter speed ratio e in accordance with $e = Np/Ne$. The speed ratio e is compared with a divergency speed ratio $e_s$ to determine whether it is in a converter operational state or in a zone to be coupled.

The desired transmission ratio id is fed to a ratio change start deciding section 93. The deciding section determines that the transmission starts to upshift when the desired ratio id is smaller than the largest transmission ratio 2.5 (id<2.5). Output signals from the section 92, 93, and the shift position sensor 85 are applied to a lockup deciding section 94 where a lockup-on signal is produced at starting of the transmission in the coupling zone at a D range selection. The lockup-on signal is applied to the solenoid operated valve 67 through a driver 95.

Figure 4:
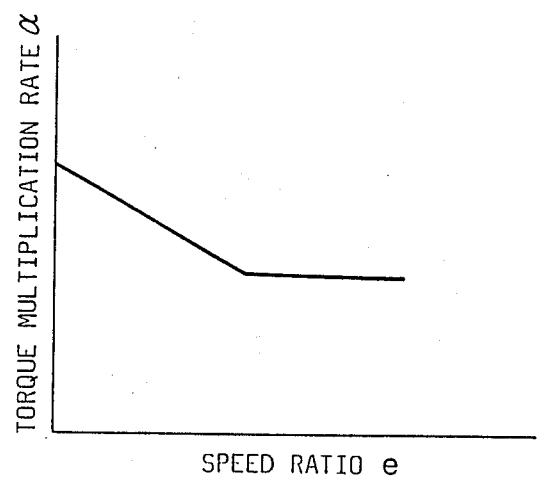
FIG. 4 is a graph showing a characteristic of a torque multiplication rate of a torque converter.

Further, the throttle position signal θ and the engine speed signal Ne are fed to an engine torque calculator 96, so that engine torque Te is calculated based on throttle position θ and engine speed Ne. The speed ratio e is applied to a torque multiplication rate table 97 when the transmitting torque is varied in accordance with the increase of the torque of the torque converter. A torque multiplication rate α is derived from a table, as shown in FIG. 4. The engine torque Te and the torque multiplication rate α are applied to an input torque calculator 98, so that an input torque Ti is calculated by $Ti = Te \cdot \alpha$.

On the other hand, the actual transmission ratio i from the calculator 86 is applied to a necessary line pressure table 99 to derive a necessary line pressure $P_{LU}$ per unit torque. The necessary line pressure $P_{LU}$ and the input torque Ti are applied to a desired line pressure calculator 100 where a desired line pressure $P_L$ is calculated by $P_L = P_{LU} \times Ti$.

The desired line pressure $P_L$ is applied to a duty cycle table 101 to derive a duty cycle $D_L$ corresponding to the desired line pressure $P_L$. The duty cycle $D_L$ is supplied to driver 102 which operates the solenoid operated on-off valve 51 at the duty cycle.

Operations of the system will be described hereinafter.

When the P or N range is selected at starting, oil in the forward clutch 17 and the reverse brake 18 are drained. Thus, the planetary gear 16 is released to disengage the transmission 5. At the same time, oil pumps 34 and 36 are driven by the oil pump driving shaft 35 and the converter cover 11 to supply pressurized oil to the line pressure control valve 42, regulator valve 61 and reducing valve 48. The line pressure is applied only to the cylinder 24 of the driven pulley 25 so that the drive belt 26 engages with the driven pulley 25 at a maximum running diameter to provide the largest transmission ratio (low speed stage). In this state, lockup deciding section 94 applies a lockup-off signal to the solenoid operated valve 67 so as to apply the pressurized oil to the release side chamber 66 of the lockup clutch 15. The oil is further supplied to the torque converter 12 so as to operate it.

When the D range is selected, the actuating pressure is applied to the forward clutch 17 to lock the planetary gear 16, so that the input shaft 13 is engaged with the main shaft 20. Thus, the torque converter 12 operates to transmit the power of the engine to the automatic transmission 5. The power of the engine is transmitted to the output shaft 23 at the largest transmission ratio by the drive belt 26 and pulleys 22, 25 and further transmitted to axles 32 of the driving wheels 33 through the final reduction device 6. Thus, the device is started.

At the start of the vehicle, torque converter 12 multiplies the output torque of the engine at a small speed ratio e. The torque multiplication rate α is derived from the table 97 so as to increase the desired line pressure $P_L$. Thus, the line pressure controlled by the line pressure control valve 42 is increased in accordance with the maximum transmission ratio and engine torque thereby transmitting the torque multiplied by the torque converter without slipping of the belt.

After starting, when the driven pulley speed Ns increases and the desired trasmission ratio id derived from the desired transmission ratio table 87 becomes id<2.5, the duty cycle table 90 produces the duty cycle signal D through the calculator 89. The transmission ratio control valve 45 is operated by solenoid valve 52, for controlling the pressure applied to the cylinder 21 of the drive pulley 22. Thus, the change of the transmission ratio is started.

Figure 5:
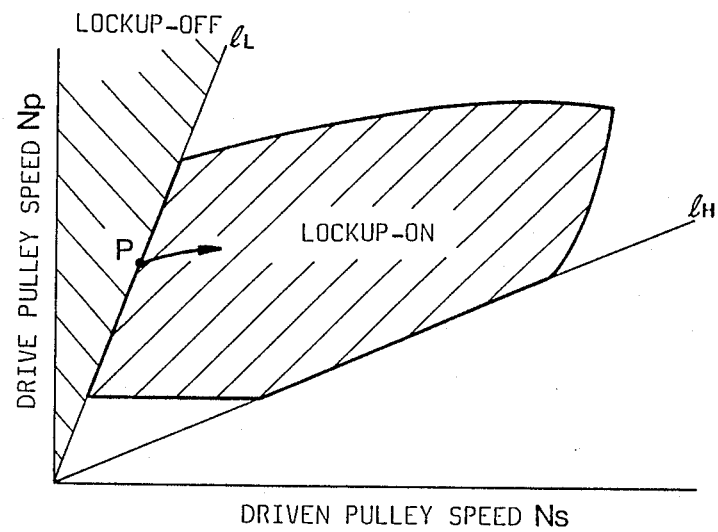
FIG. 5 is a diagram showing lockup clutch operation zones.
Figure 6A:
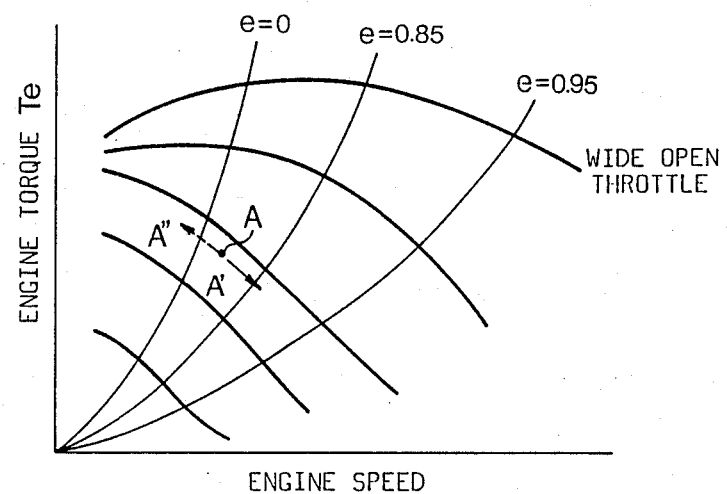
FIGS. 6a and 6b are graphs showing characteristics of the torque converter.
Figure 6B:
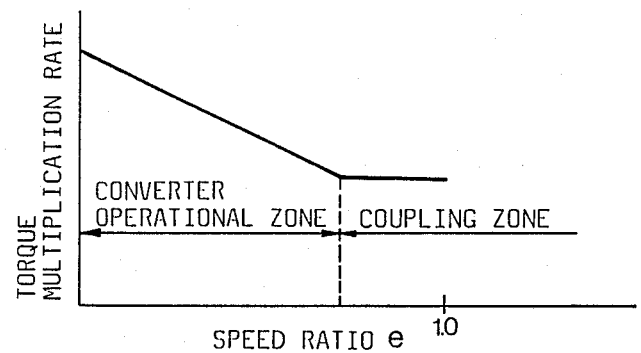
Figure 7:
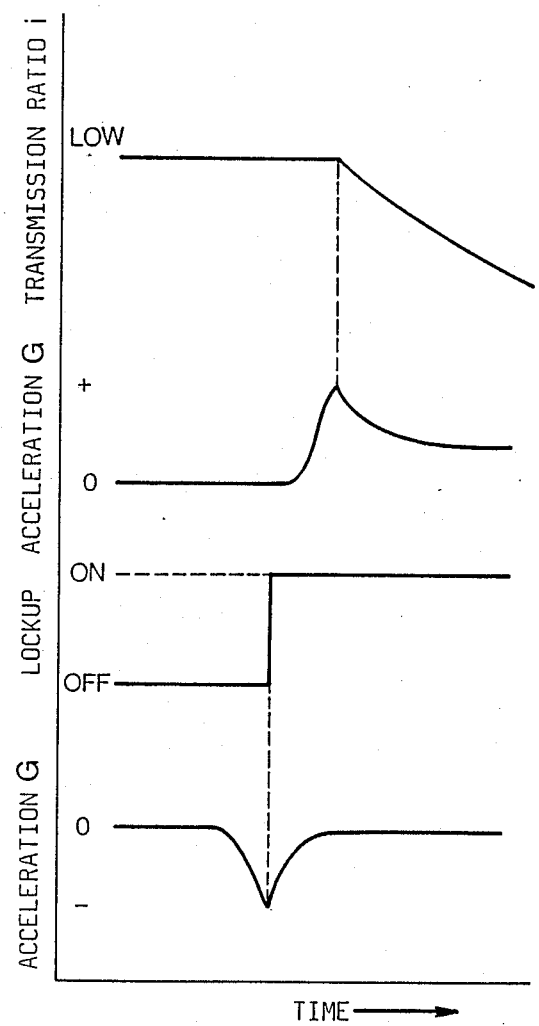
FIG. 7 is a diagram showing acceleration characteristics at a start of the transmission ratio change and at a lockup of the torque converter.

Namely, the vehicle speed output signal Ns increases along a largest transmission ratio line 1L as shown in FIG. 5. The transmission ratio starts to change as shown by an arrow at a point P.

At that time, when the drive pulley speed Np increases so that the speed ratio e approaches 1, the lockup deciding section 94 produces the lockup-on signal under the condition that the section 94 is applied with an output signal of the ratio change start deciding section 93. The lockup-on signal is fed to the solenoid operated valve 67 through driver 95. The lockup control valve 63 is operated by the solenoid operated valve 67 to a lockup range. The oil in the release side chamber 66 is drained through the passage 65 so that lockup clutch 15 is pushed by the oil pressure in the torque converter 12. Thus, the lockup clutch 15 comes in contact with the converter cover 11 to lock the crankshaft 2 and the lockup clutch 15, which means locking of the torque converter 12. Therefore, the engine power can be transmitted to the input shaft 13 through the lockup clutch 15. Accordingly, as shown in FIG. 5, the lockup range is determined in the range between the largest transmission ratio line 1L and a smallest transmission ration line 1H after starting the transmission.

In this state, since the torque multiplication rate α becomes one (α=1), the line pressure is controlled in accordance with the actual transmission ratio i and the engine torque Te.

In the control system of the present invention, the torque converter is not locked up at a largest transmission ratio at starting of the vehicle. Thus, the torque multiplication of the torque converter is sufficiently utilized.

The torque converter is locked up in the transmission changing state, thereby improving the efficiency of the power and fuel consumption.

The start of the transmission ratio change is simultaneous with the lockup operation to cancel +G shock and −G shock.

Accordingly, acceleration characteristic is improved to reduce the shock at starting.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling a belt drive continuously variable transmission for transmitting power of an engine to wheels of a vehicle, said transmission having a belt running over a drive pulley and a driven pulley, the system having a hydraulic circuit including a transmission ratio control valve operated in accordance with driving conditions of the vehicle, for controlling transmission ratio of the transmission, and the transmission having a torque converter with a lockup clutch, the system comprising:

a control valve provided to be operated in accordance with driving conditions of the vehicle, for controlling oil supplied to the transmission ratio control valve for changing of the transmission ratio;

a lockup control valve provided to be operated in accordance with driving conditions of the vehicle to engage the lockup clutch;

means for detecting speeds of the engine, said drive pulley and said driven pulley;

calculator means for comparing said engine speed and drive pulley speed for producing a speed ratio signal;

first deciding means for producing a start signal for starting of the changing of the transmission ratio in accordance with driving conditions;

second deciding means for producing a lockup signal for engaging of the lockup clutch in accordance with said speed ratio signal, driving conditions and said start signal;

actuating means responsive to the start signal and to the lockup signal for operating the control valve and the lockup control valve, respectively and for starting the change of the transmission ratio and for engaging the lockup clutch at substantially same time.

2. The system according to claim 1 wherein the first deciding means includes means for producing a desired transmission ratio signal, and is arranged to produce the start signal when the desired transmission ratio becomes smaller than a maximum transmission ratio.

3. The system according to claim 1 wherein the second deciding means produces the lockup signal when the speed ratio of an output member of the torque converter to an input member becomes larger than a predetermined value.

4. The system according to claim 1, wherein
said speed ratio signal represents an actual torque converter speed ratio constituting ratio of speed of an output member to speed of an input member of the torque converter, the latter being connected between said engine and said drive pulley, said calculator means compares said actual torque converter speed ratio with a predetermined speed ratio, and said second deciding means produces said lockup signal when said actual torque converter speed ratio is greater than said predetermined speed ratio upon occurrence of said start signal.

5. The system according to claim 4, wherein
said calculator means comprises a torque converter speed ratio calculator connected to an input of said second deciding means, said torque converter speed ratio calculator is responsive to said detecting means and produces said actual torque converter speed ratio by dividing said drive pulley speed by said engine speed and compares said actual torque converter speed ratio with said predetermined speed ratio.

6. The system according to claim 5, further comprising
an input torque calculator producing a signal representing input torque which along with a necessary line pressure corresponding to an actual transmission ratio controls line pressure in the hydraulic circuit,
an engine torque calculator responsive to speed of said engine and position of a throttle of the engine, and producing and sending engine torque to said input torque calculator, and
a torque multiplication rate table responsive to said actual torque convertor speed ratio for producing and sending a torque multiplication rate to said input torque calculator, said torque multiplication rate decreasing with an increase in said actual torque converter speed ratio before said lockup clutch is locked up and is unity when said lockup clutch is locked up,
said input torque calculator multiplies said engine torque and said torque multiplication rate to produce said signal representing input torque.

* * * * *